Figure 1:
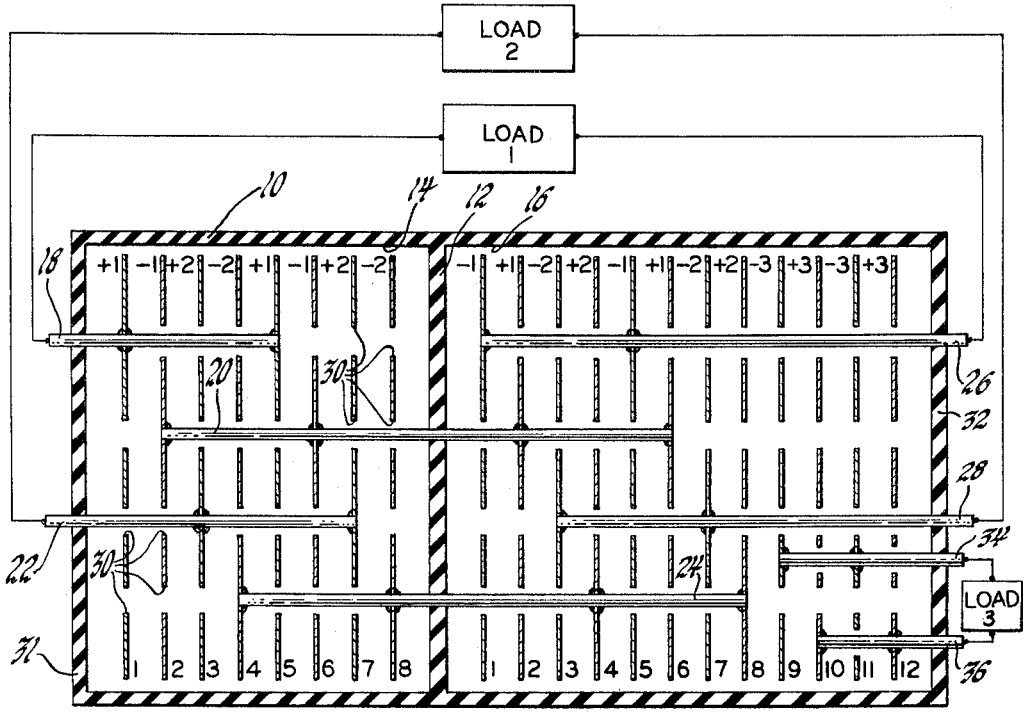

INVENTOR.
Warren R. Schilke
BY
R. J. Wallace
ATTORNEY

March 22, 1966  W. R. SCHILKE  3,242,009
BATTERY

Filed Nov. 21, 1961  2 Sheets-Sheet 2

INVENTOR.
*Warren R. Schilke*
BY
*C. J. Wallace*
ATTORNEY

United States Patent Office 3,242,009
Patented Mar. 22, 1966

3,242,009
BATTERY
Warren R. Schilke, Anderson, Ind., assignor to General Motors Corporation, Detroit, Mich., a corporation of Delaware
Filed Nov. 21, 1961, Ser. No. 153,987
4 Claims. (Cl. 136—6)

This invention pertains to batteries. More particularly, this invention relates to an improved battery construction which permits the manufacture of extremely compact, lightweight batteries of high reliability.

It is well recognized that there are many applications which require a battery which is extremely compact and low in weight. Batteries which serve as power supplies for missiles and the like inherently must be compact, low in weight and highly reliable. While it is obvious that a missile battery must be as compact and light as possible, it is not as readily appreciated that reliability of the battery is at least as important. Consequently, improvements in reliability of the battery are at least as significant advancements to missile batteries as are reductions in size and weight.

It is a primary object of the present invention to provide a battery which is suitable as a missile battery and which is improved over previous batteries in all three of the named areas. It is not only more compact and lighter in weight than batteries heretofore produced but also more reliable than analogous batteries heretofore produced.

Reliability is a function of the number of interdependent parts of a given article. Accordingly, mere reduction in number of parts while only maintaining equal quality can constitute an improvement in reliability. The battery provided by my invention is more compact, lighter and more reliable, since its construction involves fewer parts and fewer interconnections. Hence, a lesser number of items to occupy space, add weight and increase the possibility of failure. My invention provides an improved method of interconnecting plates in a single cell as well as plates of adjacent battery cells in which plates of opposite polarity in adjacent battery cells share the same current collector.

It is not at all unusual that two independent direct current power sources are required for operation of the various electrical systems in a missile. Accordingly, it has been the practice to employ two independent batteries for this purpose. These batteries, therefore, had separate cell containers, separate cell interconnectors and separate cell assemblies, each of which had to be contained in a housing. It is in this area that additional benefits of my invention are particularly realized. A feature of my invention is to provide a compact, lightweight, multi-battery power supply in which two independent voltaic cells are housed within the same container and share the same electrolyte.

Figure 7:
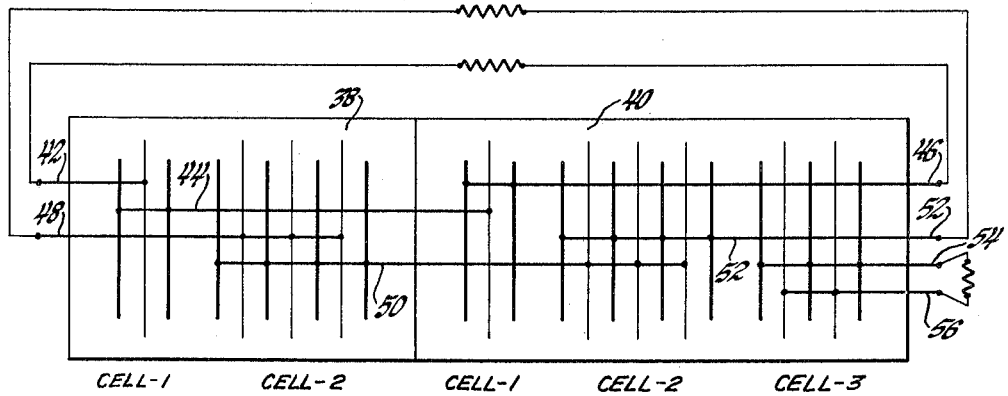
Figure 8:
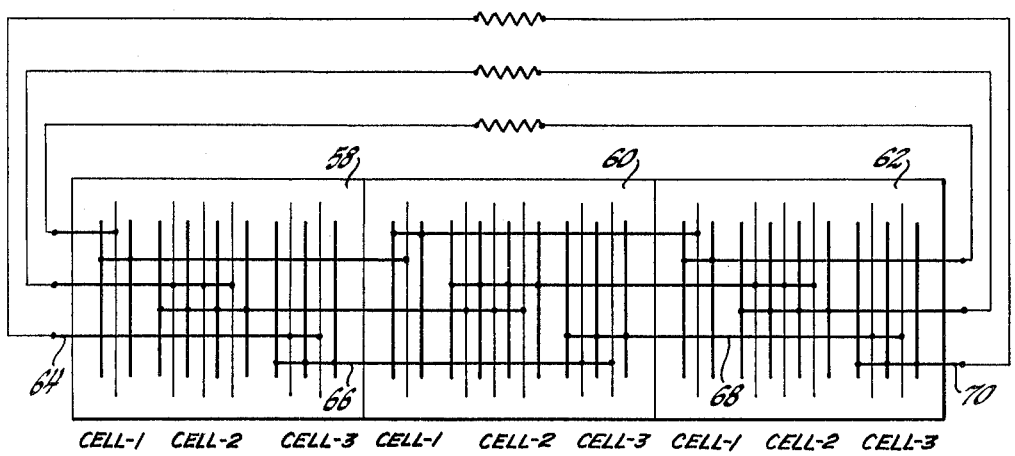

Other objects, features and advantages of the invention will become more apparent from the following preferred examples thereof and from the drawing, in which:

FIGURE 1 shows a diagrammatic view of a triple battery unit construction formed in accordance with the invention;

FIGURES 2 through 6 contain elevational views of battery plates used in the battery construction shown in FIGURE 1;

FIGURE 7 shows by means of an electrical diagram a commercially preferred plate arrangement for the triple battery unit shown in FIGURE 1; and FIGURE 8 shows an electrical diagram of another triple battery unit formed in accordance wtih the invention.

Briefly, the invention comprehends a battery construction in which a plurality of positive and negative battery electrodes are disposed in a single container, sharing the same electrolyte and independently electrically connected by transversely extending conductors to form a plurality of independently dischargeable voltaic cells. In greater particularity, the invention encompasses a plural battery unit formed of a number of containers, each of which contains at least two pairs of adjacent positive and negative battery plates. One of the battery plates has an electron conductor in electron contact with it and also in contact with any number, but not all, of similar polarity plates disposed in the container. A second conductor is in contact with the balance of the plates of that polarity in the container. Neither of the two conductors is in contact with plates of opposite polarity in the container. A similar conductor-plate arrangement is used for the plates of opposite polarity in the container.

A better understanding of the invention can be more readily obtained by a descripiton thereof in connection with the drawing. Accordingly, reference is made to the diagrammatic view shown in FIGURE 1. In order to facilitate description and comprehension of the invention, the plural battery unit in FIGURE 1 is shown with each cell of each battery having an even number of plates, contrary to conventional commercial practice, and with battery plates of opposite polarity alternately disposed.

In FIGURE 1 there is a battery housing 10 having a transverse wall 12 which divides the housing into two compartments 14 and 16. A plurality of alternately disposed spaced positive and negative battery plates are contained in each of the compartments, as indicated in the figure. For purposes of describing the invention, it is to be understood that all of the positive plates in a single compartment are identical and all of the negative plates are identical, from a chemical composition standpoint. By way of illustration, the active material for all of the positive plates can be silver oxide and the active material for all of the negative plates can be zinc. The plates are spaced from one another, as shown, to avoid any direct contact of adjacent plates. While in actual practice it is probably more desirable to use porous separators as a means of spacing the plates, separators are not shown in FIGURE 1, as such a showing would only unnecessarily complicate the drawing. It is to be understood, however, that close non-contacting spacing of the plates is best achieved by means of a separating element, such as porous battery paper or the like.

A horizontal electron conductor 18 is in electron contact with the first and fifth plates in the alternate series of positive and negative plates in the compartment 14. A second electron conductor 20 is in electron contact with the second and sixth of the series in the compartment 14 and extends through the wall 12 into compartment 16. A third electron conductor 22 is in electron contact with the third and seventh plates in the series in compartment 14. A fourth electron conductor 24 is in contact with the fourth plate and the eighth plate in the series in compartment 14. The conductor 24 also extends through the wall 12 into the compartment 16 as does the second conductor 20.

In this manner, a separate electron conductor is in contact with each one of the first four battery plates and every fourth battery plate thereafter in the alternate succession of positive and negative battery plates without being in electron contact with the interjacent battery plates. Hence, each electron conductor is in contact with only one of the first four battery plates in the series and not in electron contact with the other three.

The battery plate-conductor arrangement in the compartment 16 of the dual battery unit is analogous to that in compartment 14. However, twelve alternately disposed positive and negative plates are registered in compartment 16 while only eight positive and negative plates are registered in compartment 14. The additional four plates 9, 10, 11 and 12 in chamber 16 form still another independently dischargeable cell grouping to comprise the third battery of the unit. Cells 1 and 2 in chamber 14 are connected to cells 1 and 2, respectively, in chamber 16 in series fashion to form two two-cell batteries. Thus cell 3 in chamber 16, plates 9, 10, 11 and 12, stands alone as a single cell battery in the three-battery unit.

To form the series connection for cell 1, the extended conductor 20 is in electron contact with negative cell 1 plates in compartment 14 and positive cell 1 plates in compartment 16. Hence, it makes contact with plates 2 and 6 in both compartments. Analogously, the extended electron conductor 24 of cell 2 is in electron contact with plates 4 and 8 in both chambers. No electron contact is established between the conductors 20 and 24 and the other plates in either compartment. A conductor 26 is attached to the first negative plate, plate 1, in compartment 16 and the fourth following plate, plate 5. A conductor 28 is attached to the second negative plate, plate 3, in compartment 16 and the fourth following plate, plate 7. The conductors 26 and 28 do not establish an electron contact with any of the other plates in compartment 16.

The remaining four plates in chamber 16 have no electron connection with conductors 20, 24, 26 and 28. Hence, these plates are not dischargeable when cells 1 and 2 are discharged and form cell 3. Still a third pair of conductors 34 and 36 are associated with plates 9, 10, 11 and 12 to collect current and discharge these plates. Conductor 34 is connected to plates 9 and 11 and transversely passes through apertures in plates 10 and 12 without electron contact therewith. On the other hand, conductor 36 is in electron contact with plates 10 and 12 and is not in electron contact with plate 11. As conductor 36 begins at plate 10 and extends away from plate 9, it does not pass therethrough.

It is to be noted that the sequence of plate disposition involved in the plates of cell 3 is somewhat different from the sequence of plates shown in connection with cells 1 and 2. This is to illustrate that the disposition of plates within the chamber can be varied to some extent and still produce an independently dischargeable cell. Hence, a variation in cell 3 is evinced in that four successive alternately disposed positive and negative plates all form a single cell. These plates are, therefore, independently dischargeable when an electron communication is established between conductors 34 and 36, which thereby function as separate current collectors for plates 9 and 11 and 10 and 12, respectively.

Figure 2:
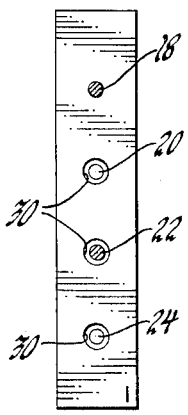
Figure 3:
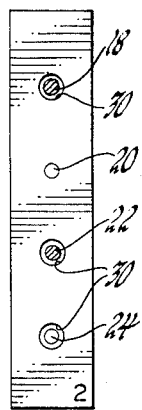
Figure 4:
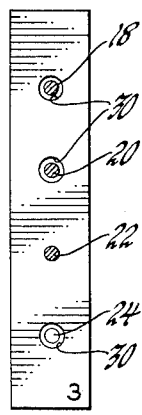
Figure 5:
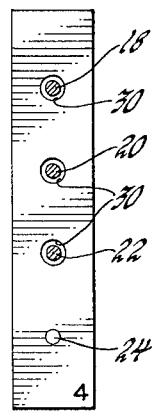

FIGURES 2 through 5, respectively, illustrate the first four plates shown in each of compartments 14 and 16. The succeeding group of four plates in each chamber is identical to this group. These plates are constructed to have a plurality of apertures therein to permit the extended conductors with which electron contact is to be avoided to transversely pass through. In FIGURE 2, battery plate 1 is shown in electron contact with conductor 18, with conductors 20, 22 and 24 passing through the apertures 30 therein. In FIGURE 3, the battery plate 2 is shown in electron contact with conductor 20, with the balance of the conductors passing through apertures 30 in the battery plate. In FIGURES 4 and 5, conductors 22 and 24 are shown in electron contact with the battery plates 3 and 4, respectively, with the balance of the conductors passing through apertures 30, so that no electron contact is made with them.

In this manner, each fourth succeeding battery plate of all the plates in compartment 14 and of the first eight in compartment 16 is the same and electrically connected in parallel by means of the associated conductor. As only every fourth, rather than every second, succeeding plate is connected in parallel, the two independent voltaic cells 1 and 2 are established within each compartment.

Figure 6:
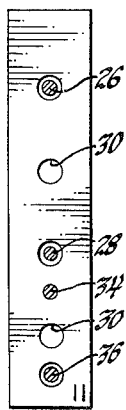

As illustrated by example of plate 11 in FIGURE 6, each of plates 9, 10, 11 and 12 has an aperture 30 therein through which laterally extending conductors 26 and 28 pass. As can be seen, no apertures are necessary for conductors 20 and 24, since these conductors are only associated with cells 1 and 2 and terminate before reaching plates 9, 10, 11 and 12. However, analogous to the conductor-plate arrangement described in connection with cells 1 and 2, conductor 34 is in electron contact with each of plates 9 and 11 while conductor 36 passes through an aperture 30 therein so that no electron contact is made with conductor 36. The conductor-plate contact arrangement is the converse for plates 10 and 12, wherein an electron contact is made with conductor 36, and conductor 34 passes through an aperture 30 in the plate.

The total number of associated plates in a given cell merely governs the amperage of each independent cell, without substantially affecting voltage, as is to be expected for any battery. While only two plates of each polarity are in the cells of each battery, any number of polarity pairs can be used. No matter how many plate pairs are desired for a cell in a compartment, the conductor-plate arrangement is still accomplished substantially in the described manner, a separate conductor for the plates of each polarity for each cell.

Of considerable importance in making a compact, reliable battery is the manner in which the various battery cells are connected in series to attain the desired voltage. It is here that my invention provides an additional benefit. Attention is again drawn to FIGURE 1. Each of the cells in compartment 14 is connected in series by a conductor to one of the cells in compartment 16. Cell 1 in compartment 14 is connected in series to cell 1 in compartment 16 by the transversely extending conductor 20. Cell 2 of compartment 14 is connected in series by conductor 24 to the three-plate cell 2 in compartment 16. The conductors 18 and 22 extend through the end wall 31 and the conductors 26 and 28 extend through the end wall 32 of the container 10 to permit collection of current generated by the two batteries. Conductors 18 and 26 are mutually connected by electron conductors to Load 1 to discharge cell 1 in each compartment. Conductors 22 and 28 are mutually connected by electron conductors to Load 2 in order to use current generated by cell 2 in each compartment. As cell 3 forms a single cell battery, there is no inter-cell conductor.

Summarizing, conductor 18 is connected to the positive plates of cell 1, with an ion connection being established between the negative and positive plates of cell 1 by means of an electrolyte (not shown). The negative plates of cell 1 in compartment 14 are connected to the positive plates of cell 1 in compartment 16 by means of the inter-cell conductor 20. An ion connection is established by an electrolyte (not shown) between the positive and negative plates of cell 1 in compartment 16. The negative plates of cell 1 in compartment 16 are secured to conductor 26 which extends through the end wall 32 of the housing. Thus, the external connection of a load to conductors 18 and 26 merely discharges cell 1 plates in both compartments while leaving cell 2 plates uneffected. Analogous arrangement permits discharge of cell 2 and cell 3 plates without affecting cell 1 plates.

As previously indicated, FIGURE 1 illustrates a battery containing cells having an even total number of plates, which is contrary to conventional commercial practice. In actuality, one rarely finds that positive and negative plates are comparable in performance or cost and, for one reason or another, one generally prefers to employ an uneven number of plates per cell. Moreover, as also previously indicated, the particular disposition of the plates forming the multiple battery unit can be varied without departing from the spirit of the invention. Hence, while the battery plates shown in FIGURE 1 involve a series of matched plates of separate cells alternatively disposed, other arrangements can be made.

Reference is now made to FIGURE 7, which by means of an electrical diagram, shows a three-battery unit somewhat analogous to that shown in FIGURE 1 but differing in plate arrangement and number. In FIGURE 7, the negative plates are indicated by the shorter vertical lines and the positive plates indicated by the longer vertical lines. For purposes of discussion, it is to be assumed that all the positive plates in a given chamber are identical and all the negative plates in a given chamber are identical. It can be seen that two groups of independently dischargeable plates are contained in chamber 38 while three groups of independently dischargeable plates are contained in chamber 40. Each of these groups involves an uneven number of battery plates, such as would be most desirable in forming a zinc-silver oxide battery. In such a battery it is preferred to enclose the positive plates by negative plates so as to always have both surfaces of a silver oxide plate matched with a zinc plate.

Hence, the single positive plate of cell 1 in each of chambers 38 and 40 is matched with two negative plates. The three positive plates of cell 2 in each of the chambers are matched with four negative plates. Two positive plates of cell 3 in chamber 40 are mated with three negative plates.

As the sequence of the positive and negative plates shown in FIGURE 7 differs from that shown in FIGURE 1, the sequence of conductor plate contact also differs. In FIGURE 7, a conductor 42 laterally extends through one negative plate into contact with the positive plate. A conductor 44 extends from the two negative plates of cell 1 in chamber 38 through the balance of the plates in that chamber through the dividing wall into chamber 40. It then passes through one of the negative plates in cell 1 in chamber 40 into electron contact with the positive plate of cell 1 in that chamber to effect a series contact between these two cells. The conductors do not make electron contact with any plates except as described. Hence, the arrangement is identical in concept to that more fully described in connection with FIGURE 1.

More briefly, cell 2 has its positive plates in contact with conductor 48 and its negative plates in contact with conductor 50, the latter conductor extending to the positive plates of cell 2 in chamber 40. The negative plates of cell 2 in chamber 40 are connected to the conductor 52 which extends laterally through the plates of cell 3 without electron contact therewith.

The plate-conductor arrangement of cell 3 is analogous to that discussed in connection with cell 3 of FIGURE 1. A separate conductor 54 is provided for electron contact with the negative plates of cell 3 and a separate electron conductor 56 is provided for electron contact with the positive plates of cell 3. Neither of these conductors is in electron contact with the balance of the plates in chamber 40.

There is, therefore, established a three battery unit in which each battery of the unit is separately dischargeable. An electron contact established between conductors 42 and 46 discharges cell 1. An electron contact between conductors 48 and 52 separately discharges cell 2. An electron contact between conductors 54 and 56 independently discharges cell 3.

While the invention has been described in connection with a three-battery unit in which the third battery has only a single cell, it is readily cognizable that a third cell or even a fourth cell, fifth cell, etc. can be provided in every separate chamber of the multiple battery unit. To illustrate the manner in which such a multiple battery would be formed, an electrical diagram has been provided in FIG. 8. Here there is shown a three-battery unit having three chambers 58, 60 and 62. In each of these chambers there is provided three independently dischargeable plate groupings. It is to be noted that, as is common in conventional commercial practice, these cell groupings involve an uneven number of plates. As in FIGURE 7, the positive plates in FIGURE 8 are indicated by the longer vertical lines and the negative plates indicated by the shorter vertical lines.

The conductor-plate arrangement for cells 1 and 2 is identical to that shown in FIGURE 7. However, the conductor plate arrangement for cell 3 obviously differs, since a separate plate grouping for cell 3 is provided in each of chambers 58, 60 and 62, not just one of them. Conductor 64 is in electron contact with the positive plates of cell 3 in chamber 58. Conductor 66 is in electron contact with the negative plates of cell 3 in chamber 58 and extends laterally into chamber 60 into electron contact with the positive plates of cell 3 in that chamber. Hence, a series connection between each cell 3 in chambers 58 and 60 is established. Analogously, a series connection is established between each cell 3 in chambers 60 and 62 by means of conductor 68. This conductor, in electron contact with the negative plates of cell 3 in chamber 6 extends through chamber 62 into electron contact with the positive plates of cell 3 in that chamber. Conductor 70 is in electron contact with the negative plates of cell 3 in chamber 62. As is inherent in my invention, the noted conductors do not make electron contact with any other plates in the chambers excepting as has been expressed. Electron communication between conductors 64 and 70 discharges each cell 3 in every chamber without affecting cells 1 and 2 in these chambers.

It is to be understood that while this invention has been shown diagrammatically, for purposes of clarity, the specific physical configuration of the cell electrode, or battery plates, can vary considerably. For example, the plates can be square, circular, annular, oval, etc. in configuration. Of particularly significant interest is an annular electrode configuration, which would permit this multi-battery construction to be employed in conjunction with my battery design shown in United States patent application Serial No. 153,986, entitled "Battery," which is concurrently filed and which is assigned to the assignee of the present invention. The use of annular battery plates connected as presently described and used in a battery construction, such as described in the aforementioned United States patent application Serial No. 153,986, would provide an even more compact battery and an even more highly reliable battery than would otherwise be obtainable.

It is to be recognized that while this invention has been described in connection with certain specific examples, no limitation is intended thereby except as defined in the appended claims. Accordingly, while an alternate disposition of the battery plates has been used for the description for purposes of illustration, it is to be understood that the basic concepts of the invention might be used with other plate arrangements. Analogously, a variety of conductor connection sequences, other than those described can be used to form a plurality of cells having different numbers of plates in the same compartment without departing from the spirit of the invention.

I claim:

1. A multi-voltaic cell unit comprising a container, a plurality of positive and negative plates having apertures therein and spaced from one another in said container forming at least two voltaic cells and a separate electron conductor in electron contact with plates of each polarity for each cell in said container, said conductors extending transversely from the plates with which they are in electron contact through apertures in other plates in said container without electron contact therewith and out the wall of the container.

2. A multi-voltaic cell unit comprising a container, a plurality of alternately disposed spaced positive and negative plates in said container forming a plurality of voltaic cell groups, each of said plates having apertures therein, a first electron conductor in electron contact wtih a positive plate of a first group and extending transversely therefrom without electron contact with any negative plates and the positive plates of other cell groups in said container by passing through apertures in the plates and through a wall of the container, a second electron conductor in electron communication with a negative plate of said first group adjacent said positive plate of that group and extending transversely therefrom without electron contact with any positive plates and negative plates of other cell groups in said container by passing through apertures in the plates and through a wall of the container, a third electron conductor in electron communication with a positive plate of at least one of the other groups and extending transversely therefrom without electron contact with any negative plates and positive plates of said first group in said container by passing through apertures in the plates and through a wall of the container, and a fourth electron conductor in electron communication with a negative plate of said other group adjacent said positive plate of that group and extending transversely therefrom without electron contact with any positive plates and negative plates of said first group in said container by passing through apertures in the plates and through a wall of the container.

3. A compact plural battery unit comprising a first container, a second container adjacent said first container, a plurality of closely spaced positive and negative plates in each of said containers forming at least two voltaic cells in each of the containers, said plates having apertures therein, a separate electron conductor in electron contact with plates of each polarity for each cell in said first container, said conductors extending transversely from the plates with which they are in electron contact through said first container without making electron contact with other cells in the first container by passing through apertures and said other cells, one conductor from each of said cells in said first container extending through the walls of both containers, each of said conductors extending into said second container into electron contact with plates of opposite polarity than contacted in said first container, said plates of opposite polarity being from separate voltaic cell combinations in said second container, and separate electron conductors in electron contact with remaining plates of each polarity for each cell in said second container, said conductors extending transversely from the plates with which they are in contact without electron contact with plates of other voltaic cells in said second container or plates of opposite polarity from the same voltaic cell in said second container by passing through apertures in the plates.

4. A multi-battery unit comprising at least two containers, a plurality of alternately disposed spaced positive and negative plates in each of said containers forming a plurality of voltaic cell groups, said plates having apertures therein, a first electron conductor in electron contact with at least one positive plate of the first of said groups in a first container, said conductor extending from said plate through the apertures in all negative plates in said first container and in the positive plates of the other voltaic cell groups in said first container, without electron contact therewith, through a wall of said container, a second electron conductor in electron communication with a negative plate adjacent the positive plate of said first group, said second conductor extending from said negative plate through apertures in all the positive plates in said container and in the negative plates of other voltaic cell groups, without electron contact therewith, through a wall of said first container, a third electron conductor in electron communication with a positive plate of at least one of the other groups in the first container, said third conductor extending from said plate through apertures in all negative plates in said container and in the positive plates of other voltaic cell groups in said first container, without electron contact therewith, through a wall of said first container, a fourth electron conductor in electron communnication with a negative plate adjacent the positive plate of said other group, said fourth conductor extending transversely therefrom through apertures in all the positive plates in said container and in the negative plates of other cell groups in said container, without electron contact therewith, through a wall of said container, four conductors similarly associated with plates forming a plurality of cell groups in said second container, two of the conductors in said second container being extensions of conductors in said first container, the extended conductors being in electron contact with plates in said second container of opposite polarity from the plates with which they are in electron contact in said first container, and the remaining conductors forming exterior battery terminals to which exterior electrical loads can be applied.

References Cited by the Examiner

UNITED STATES PATENTS

| 362,640 | 5/1887 | Ludlow | 136—102.5 |
| 1,934,945 | 11/1933 | Merlau et al. | 136—134.45 |
| 2,066,010 | 12/1936 | Lindem | 136—6 |

ALLEN B. CURTIS, *Primary Examiner.*

JOHN H. MACK, *Examiner.*